(12) United States Patent
Menezes et al.

(10) Patent No.: US 8,713,044 B2
(45) Date of Patent: Apr. 29, 2014

(54) DATA MANAGEMENT TOOL

(75) Inventors: Jerold P. Menezes, Irving, TX (US);
Harish D. Korapati, Irving, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 112 days.

(21) Appl. No.: 13/159,122

(22) Filed: Jun. 13, 2011

(65) Prior Publication Data

US 2012/0317144 A1    Dec. 13, 2012

(51) Int. Cl.
*G06F 17/30* (2006.01)
(52) U.S. Cl.
USPC ............................................ 707/769; 705/34
(58) Field of Classification Search
USPC ............................................ 705/34; 707/769
See application file for complete search history.

(56) References Cited

U.S. PATENT DOCUMENTS

| | | | |
|---|---|---|---|
| 7,979,286 B2 * | 7/2011 | Manning et al. | 705/2 |
| 2008/0162535 A1 * | 7/2008 | Bak | 707/102 |
| 2009/0282011 A1 * | 11/2009 | Saino | 707/4 |
| 2010/0114941 A1 * | 5/2010 | Von Kaenel et al. | 707/769 |

* cited by examiner

*Primary Examiner* — Hung Q Pham

(57) ABSTRACT

A data management system includes a record database, an account database, a scenario database, and a computing device. The computing device includes a data management tool that is configured to identify scenarios based on information stored in the record database and store the identified scenarios in the scenario database. Further, the data management tool may associate identified scenarios with customer records stored in the account database. Upon receipt of a scenario selected by a user, the data management tool may automatically generate a query that identifies at least one customer record associated with the selected scenario, execute the query, and create a sample billing record for each customer record identified.

21 Claims, 7 Drawing Sheets

DATA MANAGEMENT TOOL

BACKGROUND

Data management systems allow multiple users and applications to access information stored in multiple databases. As one user creates or updates information in the database, another user may view the new or updated information in real time or after a short delay. A data management system, therefore, may allow users in different business groups and using different software to efficiently access the most up to date information.

DETAILED DESCRIPTION

A data management system includes a data management tool that may help a user generate sample billing records based on actual service records and using actual customer information. The data management system includes a record database that stores service records, an account database that stores customer records detailing customer information, and a computing device that includes the data management tool. The data management tool is configured to identify at least one scenario from the service information stored in the record database and store the identified scenarios in a scenario database. Moreover, the data management system may associate the identified scenarios with one or more customer records stored in the account database.

To use the scenarios as test cases, the data management tool may receive one or more selected scenarios from a user and automatically generate a query that identifies the customer records associated with the selected scenarios. After executing the query, the data management tool may create a sample billing record for each customer record identified as a result of the query. Each sample billing record may be presented to the user so that the user may visually determine whether the sample billing record was created properly given, for example, the combination of services to which the customer subscribes, the customer's billing preferences, the geographic location of the customer, etc.

Figure 1:
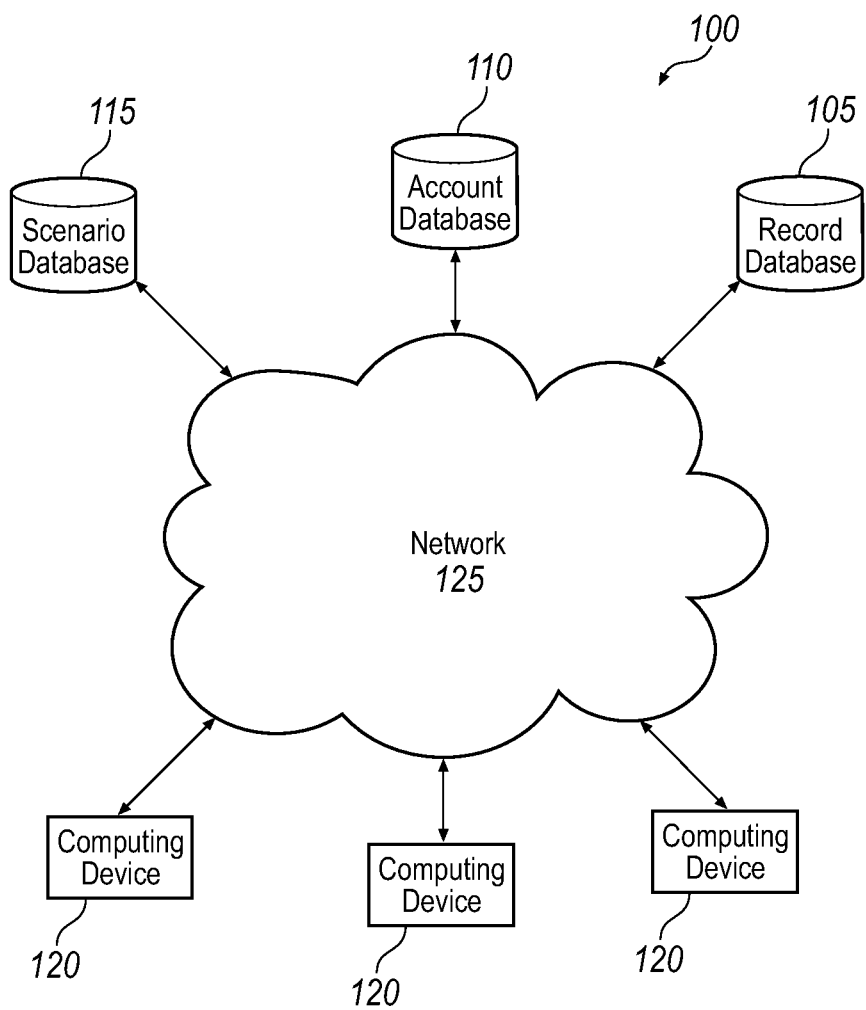
FIG. 1 illustrates an example data management system.

FIG. 1 illustrates an example data management system 100 having a record database 105, an account database 110, a scenario database 115, and a computing device 120 in communication with one another over a network 125. The system 100 may take many different forms and include multiple and/or alternate components and facilities. While an example system 100 is shown in FIG. 1, the example components illustrated in the Figures are not intended to be limiting. Indeed, additional or alternative components and/or implementations may be used.

The record database 105 may be configured to store one or more service records. Each service record may have service information detailing orders associated with a customer account. For instance, the orders may include a work request to add a new customer account or investigate an issue with a customer account, a change request to update a customer account, and the like. As such, the service information may include information regarding the type of request (e.g., a work request or change request), the date the request was submitted, the date the request was executed, an identifier (e.g., account number) of the customer who made the request, the location where the service was performed, etc.

The account database 110 may be configured to store a plurality of customer records, each including customer information. The customer information may include customer name, address, contact information such as telephone number or email address, the date the customer record was created, the date the customer record was last modified, a listing of service orders associated with the customer record, the services to which the customer subscribes, customer billing preferences, the geographic location of the customer, etc.

The scenario database 115 may be configured to store multiple scenarios. In one possible approach, each scenario may represent a customer who subscribes to one or more particular services, is located in a particular geographic region, has specific billing preferences, etc. For instance, one scenario may represent a customer who subscribes to mobile telephone service, cable television service, and internet service. An alternative scenario may represent a customer who subscribes to multiple services and prefers to receive a single bill as opposed to multiple bills. Another scenario may represent a customer who prefers to receive a single bill for multiple services and lives in the Midwest region of the United States.

Databases, data repositories or other data stores described herein, such as the record database 105, the account database 110, and the scenario database 115, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device 120 employing a computer operating system such as one of those mentioned below, and are accessed via a network, such as the network 125, in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language. While three databases are illustrated in FIG. 1, the data management system 100 may include any number of databases. Moreover, each of the databases illustrated may be implemented by multiple servers, databases, or both.

The computing device 120 may include any device configured to communicate with the record database 105, the account database 110, and the scenario database 115 over the network 125. As discussed in greater detail below, the computing device 120 may be configured to create sample billing records based on the information stored in record database 105, the account database 110, and the scenario database 115.

The sample billing records may, in one possible approach, be presented to a user so that the user may determine whether bills are correctly created for different types of customers (e.g., customers represented by different scenarios). The data management system 100 may include any number of computing devices 120.

The computing device 120 may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices 120 include, without limitation, a computer workstation, a server, a desktop, notebook, laptop, or handheld computer, or some other computing system and/or device.

Computing devices 120 generally include computer-executable instructions, where the instructions may be executable by one or more computing devices 120 such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices 120 (e.g., servers, personal computers, etc.), stored on computer readable media associated therewith (e.g., disks, memories, etc.). A computer program product may comprise such instructions stored on computer readable media for carrying out the functions described herein.

Figure 2:
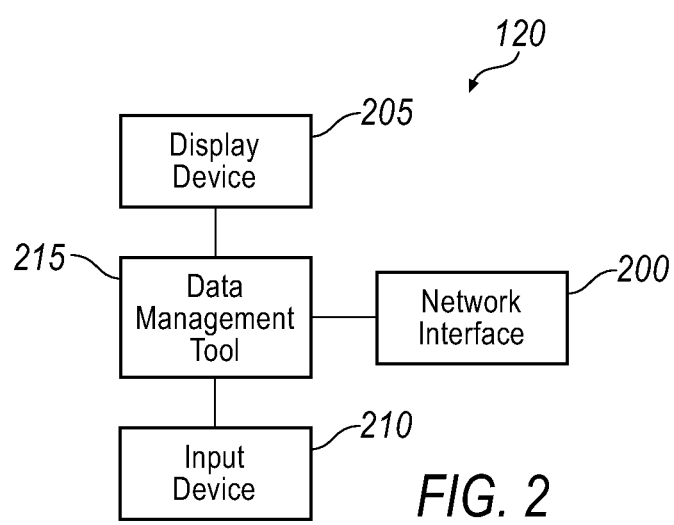
FIG. 2 is a schematic diagram of an example computing device that may include a data management tool to implement the data management system of FIG. 1.

FIG. 2 is a schematic diagram of an example computing device 120. The computing device 120, as illustrated, includes a network interface 200, a display device 205, an input device 210, and a data management tool 215.

The network interface 200 may include any device that allows the computing device 120 to communicate with other devices over the network 125. For instance, the network interface 200 may allow the computing device 120 to receive information from the record database 105, the account database 110, the scenario database 115, or other computing devices 120 (see FIG. 1) used in the data management system 100.

The display device 205 may include any device that allows the computing device 120 to present information to a user. For instance, the display device 205 may be a computer monitor, a mobile phone screen, a television, etc. In one possible approach, the display device 205 may be used to show information stored in the record database 105, the account database 110, or the scenario database 115 to the user. Moreover, the display device 205 may be used to prompt the user to provide information to the computing device 120.

The input device 210 may include any device that is configured to communicate information from the user to the computing device 120. For example, the input device 210 may include a keyboard, a computer mouse, or both. This way, the user may interact with the computing device 120 and, e.g., respond to prompts presented on the display device 205 or input information into, e.g., the record database 105, the account database 110, the scenario database 115, etc.

Figure 3:
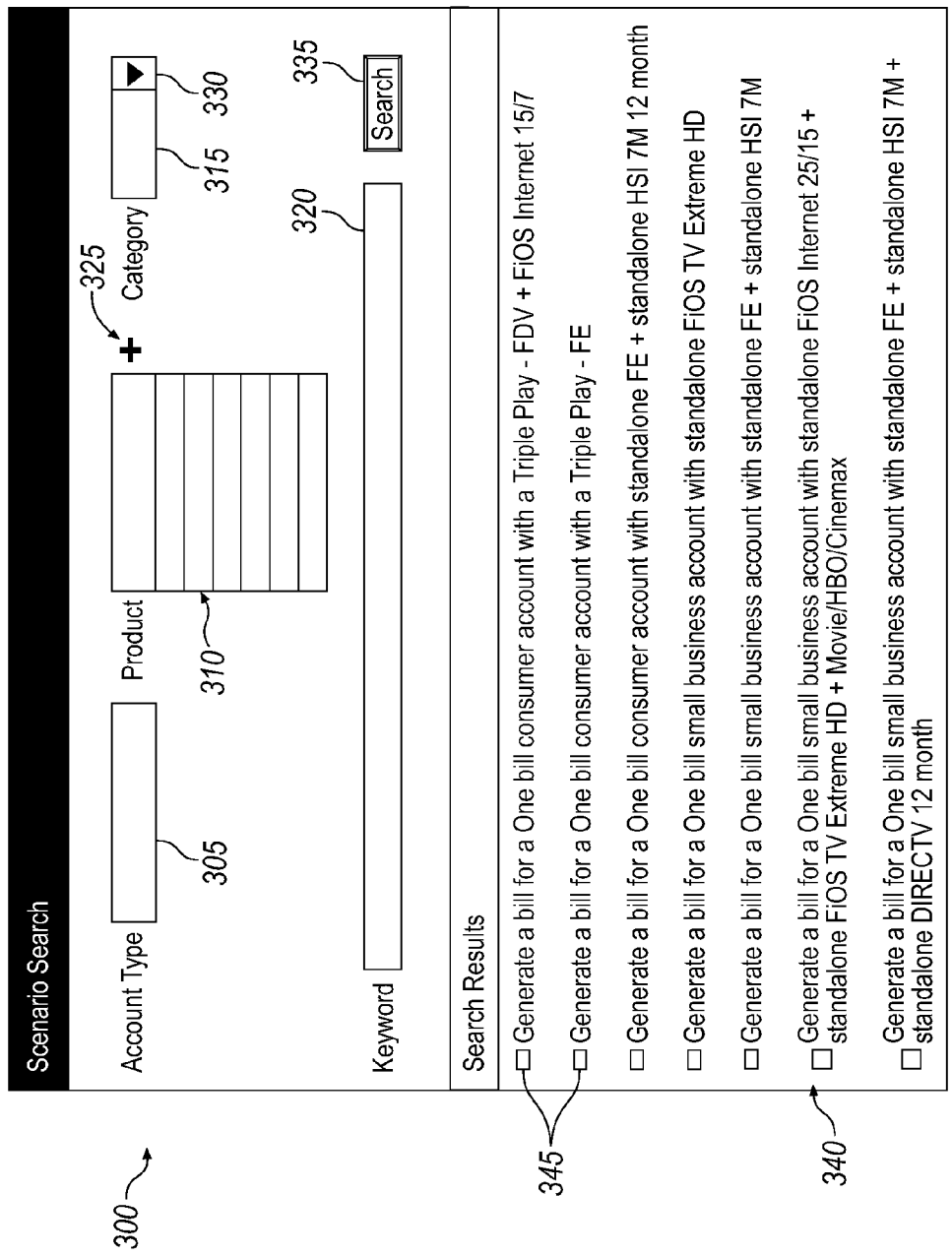
FIG. 3 illustrates an example interface that may be presented to a user of the data management system of FIG. 1.
Figure 4:
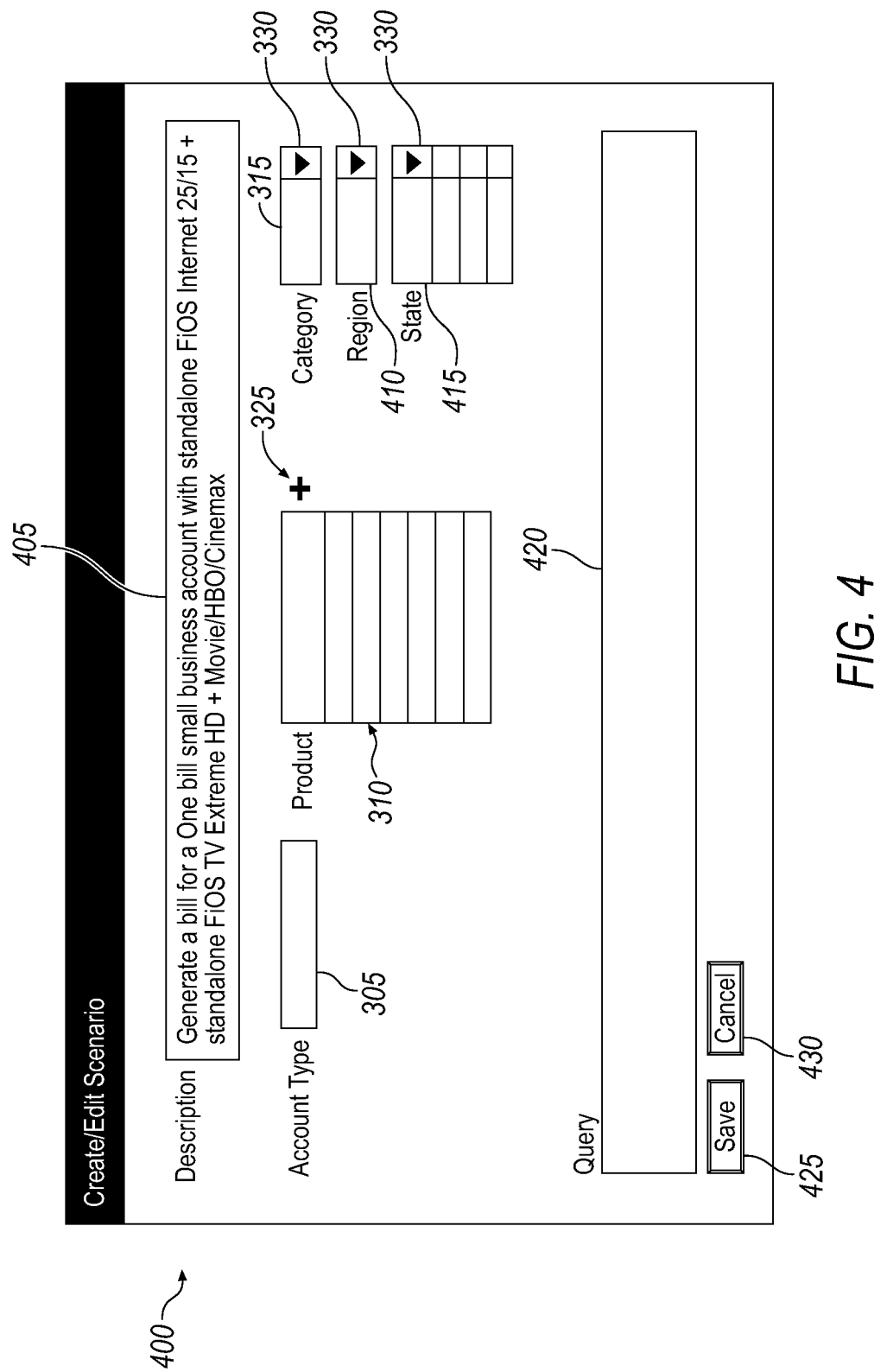
FIG. 4 illustrates another example interface that may be presented to a user of the data management system of FIG. 1.
Figure 5:
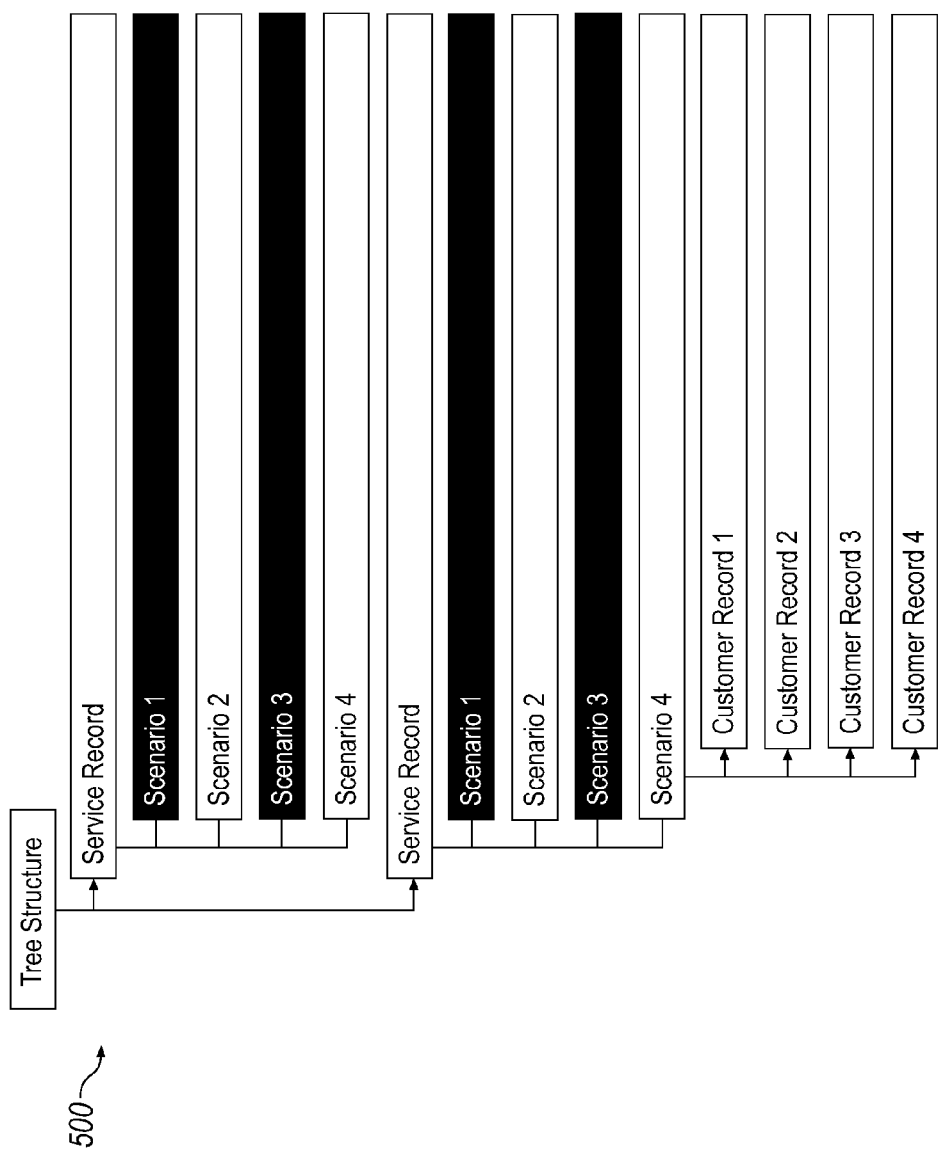
FIG. 5 illustrates an example tree structure that may be presented to a user of the data management system of FIG. 1.

The data management tool 215 may include any combination of hardware, software, or both, that allows a user to interact with the service records stored in the record database 105, the customer records stored in the account database 110, and the scenarios stored in the scenario database 115. Using the data management tool 215, therefore, the user may be able to input or update service information, customer information, or scenarios. In addition, the data management tool 215 may be configured to prompt the user via, e.g., the display device 205 to provide information and interact with the record database 105, the account database 110, or the scenario database 115 using, e.g., the input device 210. FIGS. 3-5, discussed below, are example interfaces that may be presented to the user of the computing device 120 while using the data management tool 215.

The data management tool 215, in one possible approach, may be configured to identify at least one scenario based, at least in part, on the service information included in one or more of the service records. For instance, the computing device 120 may be configured to access the service information stored in the record database 105. As discussed above, the service information may include details about, e.g., a work request or change request, as well as customer information or a link to a customer record associated with the service order. The data management tool 215 may, in one possible approach, use the service information, the customer information, or both, to identify one or more scenarios.

By way of example only, a service record may be generated in response to a customer's question about the way information was presented on a bill. A technician may determine that the bill was improperly formatted given the customer information (e.g., the services to which the customer subscribes, the customer's billing preferences, etc.) stored in the account database 110, and may update the service information included in the service record to reflect the cause of the improper formatting. The data management tool 215 may be configured to identify one or more scenarios from the service information that caused the bill to be improperly formatted. For instance, the data management tool 215 may, based on the service information, identify a specific group of subscribed services, a specific selection of customer preferences, or a combination of these, that may cause future bills to be improperly formatted. The identified scenarios, therefore, are based on actual service information and customer information.

The data management tool 215 may be configured to store one or more identified scenarios in the scenario database 115 so that the scenario may used to test, e.g., changes to the billing format or procedure. The data management tool 215 may communicate with the scenario database 115 over the network 125 and transmit each identified scenario to the scenario database 115. The scenarios may be accessed by the data management tool 215 at a later time to, for instance, create sample billing records, as discussed below.

The data management tool 215 may associate each scenario in the scenario database 115 with at least one of the customer records stored in the account database 110. For instance, as discussed above, one or more scenarios may have been identified from a service order following a customer inquiry. The customer record for the customer who inquired may be associated with the scenario in the scenario database 115. Other customers who may not have inquired may also fit the scenario (e.g., subscribe to the same services, have the same preferences, etc.). One of more customer records associated with these other customers who fit the scenario may also be associated with the scenario in the scenario database 115. In one possible approach, the customer information associated with the scenario may be masked to remove personal information, such as the customer's name, portions of the customer's address such as the street name or number, the customer's contact information, etc.

The data management tool 215 may allow a user to use the scenarios stored in the scenario database 115 to test, for instance, billing formatting changes based on actual service information. Therefore, the data management tool 215 may be configured to receive a selected scenario from a user via, e.g., the input device 210, automatically generate a query that identifies at least one customer record associated with the selected scenario, execute the query to identify the customer records associated with the selected scenario, import customer information for each customer record identified, and create a sample billing record based on the customer information for each customer record identified by the query. The data management tool 215 may present the sample billing records to the user via the display device 205, and the user may review each sample billing record to determine whether, e.g., the sample billing record is properly formatted. The data management tool 215 may further be configured to receive an indication from the user that the sample billing record was or was not properly formatted after the user has had an opportunity to review the sample billing record. In one possible approach, the user may provide the indication to the data management tool 215 via the input device 210.

The data management tool 215 may be further configured to generate a metrics report that provides the user with information such as the number of new scenarios generated over a given period of time, the number of customer records stored in the account database 110 that are associated with one or more scenarios, the number of sample billing records created over a period of time, etc.

The data management tool 215 may be further configured to authenticate the user prior to allowing the user to use the data management tool 215. For instance, the data management tool 215 may prompt the user to input credentials such as, e.g., a user name, a password, or other credential that appropriately identifies the user. Once the user has been authenticated, the data management tool 215 may be configured to determine the rights associated with the user. For instance, if the user is a technician, the data management tool 215 may determine that the user is authorized to create or edit scenarios, update service information, create or edit queries, etc. If the user is a business user, the data management tool 215 may determine that the user is authorized to create or edit work requests and change requests, create or edit scenarios, update service information, generate metric reports, etc. In one possible implementation, the data management tool 215 may determine that guests are authorized to view service information and generate reports. Once the appropriate authorization for the user is determined, the data management tool 215 may be configured to operate accordingly.

In one possible approach, the data management tool 215 may be at least partially implemented via software stored in local memory of a computing device 120. The data management tool 215 may additionally or alternatively be at least partially stored in memory located on a remote computer or server but remain accessible to the computing device 120 via the network 125. In this example approach, the data management tool 215 may be presented to the user via, for instance, a web interface.

FIG. 3 illustrates an example search interface 300 that may be presented to the user to, for instance, search for scenarios. The search interface 300 may be a graphical user interface presented to the user via the display device 205, discussed above, that allows the user to interact with the record database 105, the account database 110, and the scenario database 115 using the data management tool 215. In one possible approach, the search interface 300 may be viewable to the user through an application implemented by hardware, software, or both, on the computing device 120. For instance, the search interface 300 may be presented to the user through a web browser application. As discussed below, the user may input information into the search interface 300 to retrieve or update information stored in one or more of the databases in communication with the computing device 120.

The interface 300 of FIG. 3 includes various input fields where the user may input or select information. These fields may include an account type field 305, one or more product fields 310, a category field 315, and a keyword field 320. In the account type field 305, the user may input or select text to search for scenarios that include a specific type of account. The user may input or select text identifying different products in one or more of the product fields 310 to search for scenarios that include a specific product or products. The user may input or select text representing a category in the category field 315 to search for scenarios that include the selected category. The keyword field 320 may allow the user to input or select various terms, Boolean operators, etc., to allow for a more flexible scenario search.

As illustrated, a plus sign 325 next to one of the product fields 310 may allow the user to input text into multiple product fields 310, and thus, search for scenarios associated with multiple products. One or more fields may include a drop-down menu 330 that is populated with selectable information. In the example search interface 300 of FIG. 3, the category field 315 includes a drop-down menu 330 that is populated with categories that the user may select.

Once one or more of the fields are populated, the user may press a search button 335 to execute the search for scenarios. The search results may be displayed in a search results pane 340, and each search result may be selectable by the user. As illustrated, the search results pane 340 includes a checkbox 345 next to each search result so the user may select multiple search results, if desired. Before the search is performed, the search results pane 340 may be empty or populated with previous or common search results.

FIG. 4 illustrates an example input interface 400 that may allow the user to, e.g., create or edit scenarios. Like the search interface 300, the input interface 400 may be a graphical user interface presented to the user via the display device 205, discussed above, that allows the user to interact with the record database 105, the account database 110, and the scenario database 115 using the data management tool 215. In one possible approach, the input interface 400 may be viewable to the user through an application implemented by hardware, software, or both, on the computing device 120. For instance, the input interface 400 may be presented to the user through a web browser application. As discussed below, the user may input information into the input interface 400 to retrieve or update information stored in one or more of the databases in communication with the computing device 120.

The input interface 400 may include a description field 405, an account type field 305, one or more product fields 310, a category field 315, a region field 410, a state field 415, and a query field 420. The description field 405 may include the name of the scenario that is associated with the information stored in the other fields of the input interface 400. Additionally or as an alternative, the description field 405 may include terms associated with the scenario and that may allow the scenario to be discovered by a keyword search using, for example, the search interface 300 of FIG. 3. The account type field 305, the product fields 310, and the category fields 315 may be similar to those discussed above with respect to FIG. 3. The region field 410 and the state field 415 may allow the user to associate a particular geographic location to the scenario. As illustrated, the region field 410 and the state field 415 have a drop-down menu 330 that may be populated with, for example, names of different regions or the names of different states, respectively. The query field 420 may allow the user to input a search string that can identify customer information for specific customer records. Alternatively or in addition, the data management tool 215 may be configured to automatically populate the query field 420, as discussed below.

The input interface 400 may include buttons such as a save button 425 and a cancel button 430. The save button 425 may allow the user to save the information as presented on the input interface 400 to the scenario database 115. The save button 425, therefore, may give the same or another user the flexibility to edit existing scenarios or create new scenarios using the input interface 400. The cancel button 430 may allow the user to reject any changes made to the scenario since the previous time the scenario was saved.

Although not shown, the data management tool 215 may present similar interfaces as the input interface 400 to allow the user to create or edit customer records in the account database 110 or service records stored in the record database 105.

FIG. 5 illustrates an example tree structure 500 that may be presented to the user by the data management tool 215. As discussed above, the data management tool 215 may be configured to associate one or more customer records to each scenario. Additionally, multiple scenarios may be based on one or more service records. The data management tool 215 may be configured to present a tree structure 500 similar to the one illustrated in FIG. 5 so that, e.g., the user may quickly see which types of customer records are associated with which scenarios, and which scenarios are associated with which service records.

Figure 6:
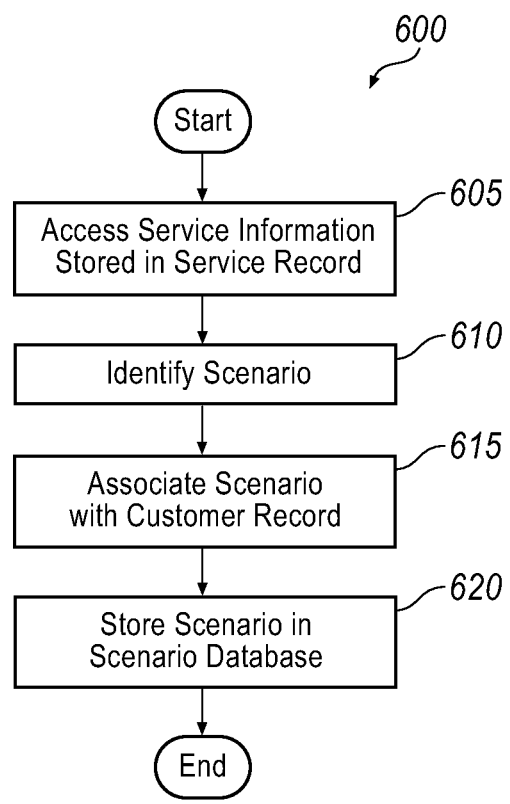
FIG. 6 is a flowchart of an example process that may be implemented by the data management system of FIG. 1 to identify scenarios from service information.

FIG. 6 is a flowchart of an example process that may be implemented by the data management tool 215 to identify scenarios based on service information stored in service records.

At block 605, the data management tool 215 may access one or more service records. For instance, the data management tool 215 may access new service records that were created within a period of time, such as within the last day, week, month, etc.

At block 610, the data management tool 215 may identify at least one scenario based at least in part on service information included in one or more of the service records accessed at block 605. That is, the data management tool 215 may use the service information to identify situations that could cause bills to be improperly formatted. Such situations may include, as discussed above, the combination of services to which the customer subscribes, customer billing preferences, etc.

At block 615, the data management tool 215 may associate each scenario identified at block 610 with a customer record or the customer information stored in the customer record. For instance, the scenario may be associated with the customer record of the customer who initiated the service record (e.g., the customer who questioned the formatting of the bill), or any other customer who falls within the defined scenario, such as customers who subscribe to the same services or have the same customer preferences as defined by the scenario.

At block 620, the data management tool 215 may store each scenario identified at block 610 in the scenario database 115. This way, for instance, the scenarios identified based on the service records accessed at block 605 may be available for future use, as discussed below with respect to FIGS. 7 and 8.

Figure 7:
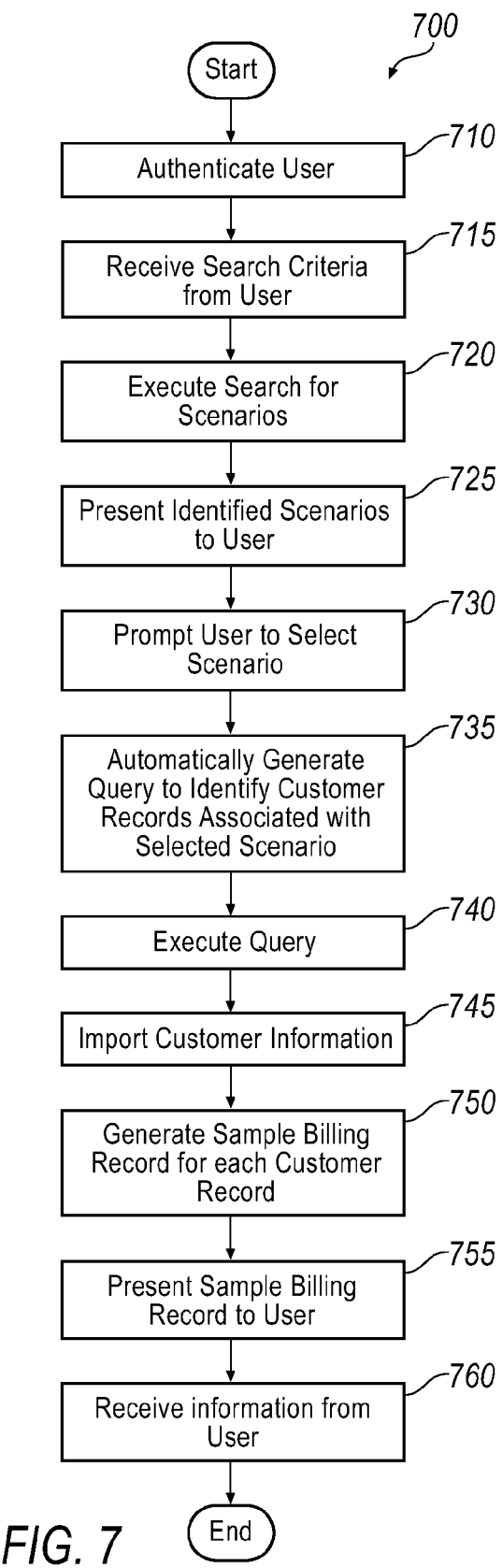
FIG. 7 illustrates a flowchart of an example process that may be implemented by the data management system of FIG. 1 to generate sample billing records.

FIG. 7 illustrates a flowchart of an example process that may be implemented by the data management system 100 to generate sample billing records.

At block 705, the data management tool 215 may authenticate the user before granting the user access to the features of the data management tool 215. For instance, the data management tool 215 may authenticate the user before allowing the user to view, edit, or otherwise interact with the information stored in the scenario database 115, the account database 110, or the record database 105. In one possible approach, the data management tool 215 may grant different types of users different access rights, as discussed above. Therefore, some users may be able to view information while other users may be able to edit or update information. In addition, some users may be authorized to generate metrics reports using the data management tool 215.

At block 710, the data management tool 215 may present, e.g., the search interface 300 to authorized users. For instance, the search interface 300 may be presented on the display device 205. In one possible implementation, the search interface 300 is viewable to the user through an application such as a web browser.

At block 715, the data management tool 215 may receive the search criteria input at block 710 from the user. As discussed above with respect to FIG. 3, the search interface 300 may allow the user to input search criteria such as the account type, one or more product names, the desired category, as well as any keywords into various fields. The user may press a search button 335 to submit the search criteria to the data management tool 215.

At block 720, the data management tool 215 may execute the search based on the search criteria provided by the user at block 715. That is, the data management tool 215 may search the scenario database 115 for existing scenarios that satisfy the search criteria input by the user.

At block 725, the data management tool 215 may present the results of the search to the user. For instance, as discussed above, the search results may be presented to the user in a search results pane 340 of the search interface 300. The scenarios that satisfy the criteria may be listed in the search results pane 340, and in one possible approach, one or more scenarios may be selectable from the search results pane 340.

At block 730, the data management tool 215 may prompt the user to select one of the scenarios. As discussed above with respect to FIG. 3, the search results pane 340 may include a checkbox 345 next to each scenario listed so that the user may select multiple scenarios.

At block 735, the data management tool 215 may automatically generate a query that identifies one or more customer records associated with the selected scenario. In one possible approach, the data management tool 215 may generate the query using a structured query language (SQL) or other computer language that can identify customer records associated with the selected scenario. In one possible approach, the data management tool 215 may generate the query based on information stored in the query field 420 associated with each scenario, as discussed above with respect to FIG. 4. If multiple scenarios are selected, the data management tool 215 may combine the information in the query fields 420 of the selected scenarios using an operator appropriate for the language in which the query is generated. In some instances, the data management tool 215 may allow the user to edit the query after it has been automatically generated.

At block 740, the data management tool 215 may execute the query generated at block 735. That is, the data management tool 215 may, as dictated by the query from block 735, identify those customer records stored in the account database 110 that are associated with the selected scenario or scenarios.

At block 745, the data management tool 215 may import customer information for each customer record identified as a result of the search performed at block 740. In one possible implementation, the data management tool 215 may mask the customer information prior to importing it. That is, the data management tool 215 may limit the amount of personal information that is imported to protect the customer's identity. For example, the data management tool 215 may remove one or more of the customer's name, account number, street number, street name, contact information, etc.

At block 750, the data management tool 215 may, using the masked customer information from block 745, create a sample billing record for each customer record identified as a result of the search performed at block 740. These sample billing records, therefore, are the result of actual service records and are based on actual customer information.

At block 755, the data management tool 215 may present each sample billing record to the user via, e.g., the display device 205. In addition, the data management tool 215 may give the user an opportunity to print a physical copy of each sample billing record or allow the user to print each sample billing record to a file so that the user may review each sample billing record offline.

At block 760, the data management tool 215 may receive an indication from the user that the sample billing record was created correctly or that remedial action is necessary. That is, by presenting each sample billing record at block 755, the data management tool 215 may allow the user to visually confirm that billing records based on the selected scenarios are properly formatted and include the correct information and charges. Once the user has had an opportunity to visually inspect the sample billing record, the user may provide an input to the data management tool 215 that indicates whether the sample billing record was or was not correctly created in light of the selected scenario and customer information associated with the selected scenario. If a sample billing record was not created correctly, the user may take remedial steps to ensure that future billing records are created properly.

Figure 8:
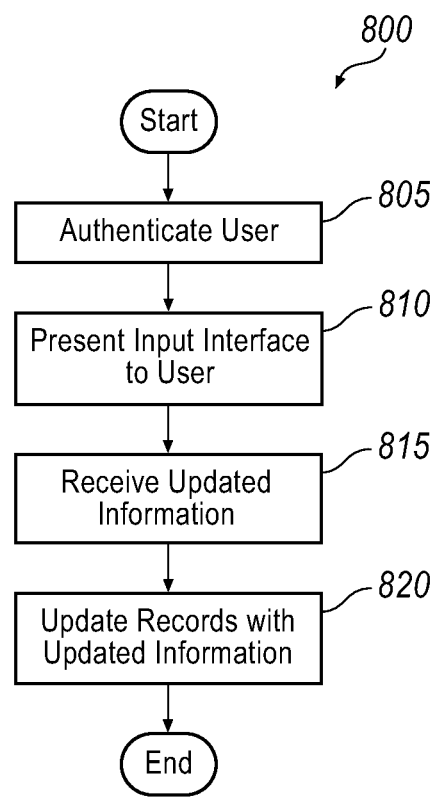
FIG. 8 is a flowchart of an example process that may be implemented by the data management system of FIG. 1 to update information in a database.

FIG. 8 is a flowchart of an example process that may be implemented by the data management system 100 to update customer, service information, or a scenario.

At block 805, the data management tool 215 may authenticate the user before granting the user access to the features of the data management tool 215. As discussed above, the data management tool 215 may grant different types of users different access rights. Therefore, the data management tool 215 may determine whether the user is authorized to update customer information, service information, or the scenario prior to allowing the user to access an interface such as the input interface 400 discussed above with respect to FIG. 4.

At block 810, the data management tool 215 may, after determining that the user is authorized, present the input interface 400 or another interface to the user. As discussed above, the input interface 400 or a similar interface may allow the user to update the information stored in the account database 110, the record database 105, or the scenario database 115.

At block 815, the data management tool 215 may receive updated information from the user. The user may input the updated information, including updated customer information and updated service information, into one or more fields of the input interface 400, and submit the updated information using a button, such as a save button 425.

At block 820, the data management tool 215 may update the appropriate records with the updated information. For instance, the data management tool 215 may update customer accounts stored in the account database 110 upon receipt of updated customer information. The data management tool 215 may update service records stored in the record database 105 after receiving updated service information. Similarly, the data management tool 215 may update scenarios stored in the scenario database 115 upon receipt of updated information presented in the input interface 400 of FIG. 4.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A data management system comprising:
a record database configured to store a plurality of service records, wherein each service record includes service information;
an account database configured to store a plurality of customer records, wherein each customer record includes customer information; and
a computing device in communication with the record database and the account database, wherein the computing device includes a data management tool configured to:
identify at least one scenario based at least in part on the service information included in at least one of the plurality of service records stored in the record database,
store each of the at least one identified scenario in a scenario database;
associate each of the at least one identified scenario with the at least one of the plurality of customer records stored in the account database,
receive a selected scenario from a user, wherein the selected scenario represents a customer record of at least one service,
automatically generate a query that identifies at least one customer record associated with the selected scenario,
execute the query,
mask customer information included in the at least one customer record identified by the query, and
create a sample billing record for each of the at least one customer record identified by the query, wherein the sample billing record includes at least a subset of the masked customer information.

2. The data management system as set forth in claim 1, wherein the data management tool is configured to import the masked customer information for each of the at least one the customer records identified by the query from the account database.

3. The data management system as set forth in claim 1, wherein the data management tool is configured to generate a metrics report.

4. The data management system as set forth in claim 3, wherein the metrics report includes at least one of a number of new scenarios identified, a number of customer records stored in the account database, and a number of sample billing records created.

5. The data management system as set forth in claim 1, wherein the data management tool is configured to authenticate the user prior to receiving the selected scenario from the user.

6. The data management system as set forth in claim 5, wherein the data management tool is configured to determine rights associated with the user and to operate based on the determined rights.

7. The data management system as set forth in claim 1, wherein the data management tool is configured to allow the user to update at least one of the service information and the customer information.

8. The data management system as set forth in claim 1, wherein the data management tool is configured to prompt the user to select at least one scenario, wherein each scenario is associated with a unique combination of a plurality of services.

9. The data management system as set forth in claim 1, wherein the computing device includes an input device, and wherein the data management tool is configured to receive the selected scenario from the user via the input device.

10. The data management system as set forth in claim 1, wherein the data management tool is configured to receive an indication from the user that the sample billing record was created correctly given the selected scenario and customer information included in the at least one customer record associated with the selected scenario.

11. The data management system as set forth in claim 1, wherein the computing device includes a display, and wherein the data management tool is configured to present the sample billing record to the user via the display.

12. The data management system as set forth in claim 1, wherein masking the customer information includes removing personal information.

13. A method comprising:
identifying at least one scenario based at least in part on service information included in at least one service record stored in a record database, wherein each of the at least one identified scenario is associated with a unique combination of a plurality of services;
storing each of the at least one identified scenario in a scenario database;
associating each of the at least one identified scenario with at least one customer record stored in an account database, wherein the at least one customer record includes customer information;
prompting a user to select at least one scenario from the scenario database, wherein the selected at least one scenario represents a customer record of at least one service;
automatically generating a query that identifies at least one of the customer records associated with the at least one selected scenario;
executing the query;
masking, via a computing device, customer information included in the at least one of the customer records identified by the query; and
creating a sample billing record for each of the at least one of the customer records identified by the query, wherein the sample billing record includes at least a subset of the masked customer information.

14. The method as set forth in claim 13, further comprising importing the masked customer information for each of the at least one of the customer records identified by the query from the account database.

15. The method as set forth in claim 13, further comprising presenting the sample billing record to the user.

16. The method as set forth in claim 13, further comprising receiving an indication from the user that the sample billing record was created correctly given the selected scenario and the customer information included in the at least one customer records associated with the at least one selected scenario.

17. The method as set forth in claim 13, further comprising authenticating the user prior to receiving the at least one selected scenario from the user.

18. The method as set forth in claim 13, further comprising receiving at least one of updated customer information and updated service information.

19. The method as set forth in claim 18, further comprising updating at least one of the customer records and the service records with at least one of the updated customer information and the updated service information.

20. A non-transitory computer-readable medium tangibly embodying computer-executable instructions that cause a processor to execute operations comprising:

identifying at least one scenario representing a test case associated with a type of customer based at least in part on service information stored in at least one service record stored in a record database, each of the at least one identified scenario being associated with a unique combination of a plurality of services;

storing each of the at least one identified scenario in a scenario database;

associating each of the at least one scenario stored in the scenario database with at least one customer record stored in an account database;

prompting a user to select at least one scenario from the scenario database;

automatically generating a query that identifies at least one of the customer records associated with the at least one selected scenario, the at least one of the customer records identified by the query falling within the test case identified with the type of customer;

executing the query;

masking customer information included in the at least one of the customer records identified by the query;

creating a sample billing record for each of the at least one of the customer records identified by the query, the sample billing record including at least a subset of the masked customer information;

presenting the sample billing record to the user; and receiving an indication from the user that the sample billing record was created correctly given the at least one selected scenario and the customer information associated with the at least one of the customer records identified by the query.

21. The non-transitory computer-readable medium as set forth in claim 20, the operations further comprising:

receiving at least one of updated customer information and updated service information; and updating at least one of the customer records and the service records with at least one of the updated customer information and the updated service information.

\* \* \* \* \*